United States Patent [19]

Romovacek

[11] 4,048,056
[45] Sept. 13, 1977

[54] METHOD FOR THE CONTROL OF PITCH OPERATION

[75] Inventor: George R. Romovacek, Monroeville, Pa.

[73] Assignee: Koppers Company, Inc., Pittsburgh, Pa.

[21] Appl. No.: 582,693

[22] Filed: June 2, 1975

Related U.S. Application Data

[62] Division of Ser. No. 383,151, July 27, 1973, abandoned.

[51] Int. Cl.² ............................................. C10C 3/06
[52] U.S. Cl. ................................. 208/41; 23/230 R; 23/253 A; 73/425.4 R; 196/132; 202/160; 203/1; 203/2; 208/44; 208/DIG. 1
[58] Field of Search ................. 208/41, DIG. 1, 44; 196/132; 23/253 A, 230; 202/160; 203/1, 2; 73/425.4 R

[56] References Cited

U.S. PATENT DOCUMENTS

| | | | |
|---|---|---|---|
| 1,135,506 | 4/1915 | Dubbs | 208/41 |
| 2,711,750 | 6/1955 | Norcross | 23/253 |
| 2,738,312 | 3/1956 | Hardman | 208/41 |
| 3,025,232 | 3/1962 | Jones | 208/DIG. 1 |
| 3,184,396 | 5/1965 | Armstrong | 202/160 |
| 3,779,892 | 12/1973 | Forster et al. | 208/44 |
| 3,868,315 | 2/1975 | Forster et al. | 208/44 |

Primary Examiner—Veronica O'Keefe
Attorney, Agent, or Firm—Herbert J. Zeh, Jr.; Oscar B. Brumback

[57] ABSTRACT

A method for controlling the production of pitch and the like is disclosed comprising simultaneously measuring the viscosity and temperature of the pitch material from the production unit, comparing the measured value with a predetermined correlation of the viscosity and temperature for the pitch, and adjusting the parameters of the production operation in response to the comparison. An apparatus for carrying out the method is also disclosed comprising a means for withdrawing and returning a sample of the pitch material from the still, a chamber for holding the sample of the pitch material, the chamber having a means for heating and cooling the sample, a temperature sensing device and a viscosity measuring device located in the chamber, and a means for recording the temperature and viscosity values. Optionally and preferably, the apparatus has a means for comparing the measured viscosity-temperature correlation with the predetermined viscosity temperature correlation of the pitch material and adjusting the parameters of the production unit in response thereto.

1 Claim, 5 Drawing Figures

METHOD FOR THE CONTROL OF PITCH OPERATION

This is a division of application Ser. No. 383,151 filed July 27, 1973, now abandoned, in favor of continuation application Ser. No. 601,071 filed July 30, 1975.

BACKGROUND OF THE INVENTION

This disclosure is directed to a method and apparatus for automatically controlling the production of pitch-like materials which have vicosity as an important characterization value. More particularly, the invention is directed to a method and apparatus for automatically controlling the production of pitch and the like by simultaneously measuring the viscosity and temperature of the pitch material, comparing this measured correlation with a predetermined correlation of the viscosity and temperature for the pitch material and adjusting the parameters of the pitch process in response thereto.

Coal tar pitches and petroleum based pitches have found wide use in various industries. They have been used for many years as waterproofing agents and protective coatings. Some examples of these uses include built-up roofings, foundation wall coatings, pipeline enamels, and many others. The pitches are usually applied in these uses as a hot melt. Some other important uses of pitches is as binders for paving materials, binders for electrodes for the aluminum and steel industries and as binders for a great variety of carbon products.

Each tar pitch has well defined characteristics and properties which are dictated generally by the end use which they are designed to serve. Normal tar pitches usually have softening points of at least about 40° and this may be as high as 135° C or higher.

The pitches of different softening points are generally prepared by subjecting the crude tar pitches to a heat treatment or to a heat treatment in combination with various chemical reactants such as oxygen or air. The most common method of preparing pitches of different softening points is distillation.

Heretofore, the production of pitches having different softening points was controlled by a totally manual process. After selection of a suitable tar source and distillation conditions (temperature and pressure) continuous pitch still operations are controlled by the softening point of the pitch product. In general, a customer specifies a certain softening point (by the ring and ball or similar method) with a latitude of plus or minus 10° C. The still operator adjusts the controls according to the desired softening of the product. This involves taking a sample from the reactor, preparing it for the softening point determination, carrying out the latter, comparing the softening point to the desired softening point, and adjusting the controls according to the comparison value. It takes from about 30 minutes to one hour to take the softening point, make the comparison and adjust the controls. After adjustments, it takes at least another half hour or so before the reaction mixture comes to equilibrium and another sample can be taken. Because of the inherent difficulties with the prior art method, there has been a desire in the industry for a better method and apparatus for controlling pitch still operations.

SUMMARY OF THE INVENTION

I have discovered a new method for controlling pitch still operations by simultaneously measuring the viscosity and temperature of the pitch, comparing this measured value with a predetermined correlation of the viscosity and temperature for the pitch and adjusting the parameters of the production operation in response to the comparison.

I have also discovered an apparatus for carrying out my method. The apparatus comprises a means for withdrawing a sample of pitch from the still and subsequently returning it thereto, a sample chamber for holding the withdrawn sample of pitch, said sample chamber having a means for heating and cooling the sample, a temperature device and a viscosity measuring device located in the chamber and a means for recording temperature and viscosity. Preferably, the apparatus has a means for comparing the measured viscosity-temperature value with a predetermined viscosity-temperature correlation and adjusting the parameters of the production unit in response to the comparison.

The method and apparatus of my invention smooths out the still operation and provides a more uniform product. In addition, it eliminates the serial laboratory testing of softening point which is often a source of erroneous results because of the operational variables and subjective judgement associated with the sample preparation and softening point determination. The method and apparatus of my invention is more accurate and easier to use than the method heretofore employed.

Another advantage of the method and apparatus of my invention is that it does not require the precise adjustment of the temperature of the product which is being analyzed. Only a course adjustment of a fairly wide temperature range is needed. This is very important for pitch materials because precise adjustment of the temperature during a short period of time is almost impossible due to very slow heat transfer in media of high viscosities.

The apparatus and method of my invention are based on the fact that there is a linear correlation between the temperature of equal viscosity and the softening point (as determined by ring and ball or cube-in-air or some other conventional technique). The viscosity temperature measurement provides a means for the continuous measurement of instantaneous softening point values. The direct linear correlation between the temperature of equal viscosity and conventional softening points can be used to accurately determine the conventional softening value by measuring the viscosity-temperature correlation. The viscosity temperature value is measured at changing but exactly known temperature. This measurement is then compared to a predetermined viscosity temperature correlation and the operation variables are adjusted in accordance with this comparison.

From the above it can be seen that the apparatus of my invention is based upon the measurement of the viscosity and temperature. The apparatus of my invention may be better understood with reference to FIGS. 1 and 2.

Figure 1:
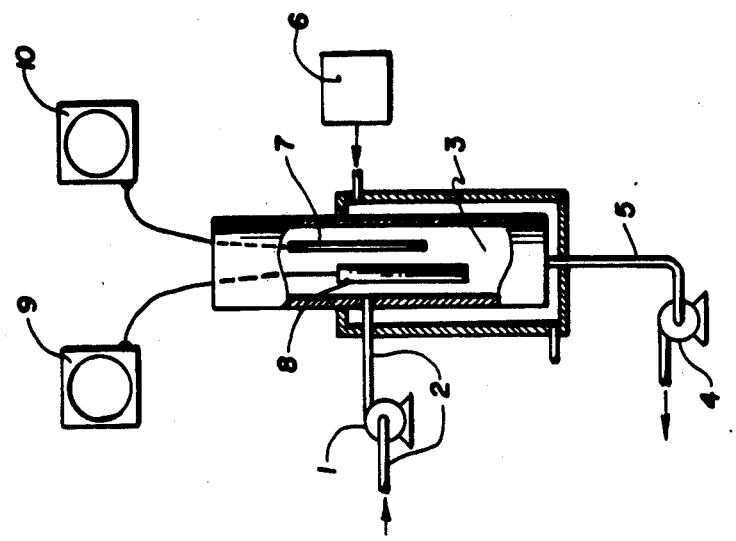
FIG. 1 is an illustration of an apparatus of my invention for measuring the viscosity and temperature which values may subsequently be used for controlling the pitch still operation.

More specifically, with reference to FIG. 1, there is provided a means 1 for removing a sample of pitch from the reactor through conduit 2 into sample chamber 3. There is also provided a means 4 which operates in cooperation with means 1 to remove the sample from chamber 3 via conduit 5 and return it to the still. Sample chamber 3 has a means 6 for heating and cooling the sample contained therein. Chamber 3 also has located strategically therein a temperature sensing means 7 and a viscosity sensitive means 8. The viscosity sensing means 8 is connected to a viscosity read out means 9 and the temperature sensing means is connected to a temperature read out means 10. The viscosity sensing means and temperature sensing means are also connected with the heating and cooling means 6 which is responsive to signals from the viscosity sensing and temperature sensing means.

Figure 2:
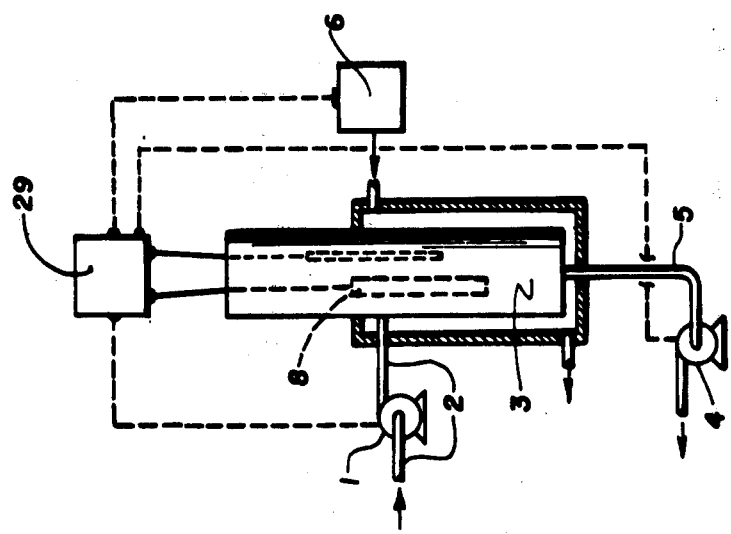
FIG. 2 illustrates an apparatus of my invention for measuring the viscosity temperature correlation comparing it to a predetermined correlation and automatically controlling the pitch operation from the comparison.

More specifically, with reference to FIG. 2, there is provided an apparatus for automatically controlling the pitch still operation. There is provided a means 1 for removing a sample of pitch from the still through conduit 2 into sample chamber 3. There is also provided a means 4 which operates in cooperation with means 1 to remove the sample from chamber 3 via conduit 5 and return it to the still. Sample chamber 3 has a means 6 for heating and cooling the sample contained therein. Sample chamber 3 also has located strategically therein a temperature sensing means 7 and a viscosity sensing means 8. The viscosity sensing means and temperature sensing means are connected with computer 29. The send signals to the computer and operate in response to signals from the computer. The computer 29 is connected with the heating and cooling means 6 which operates in response to signals from the computer.

The apparatus for measuring viscosity temperature correlation described in FIGS. 1 and 2 operate in the following manner. A sample of hot pitch is brought from the reactor through conduit 2 into sample chamber 3. If the sample is to hot then the cooler is activated by the temperature sensing means. If the temperature is too low, the heating means is activated and the sample heated until it reaches the desired temperature. When the temperature of the sample is sufficiently hot, the cooling means is activated and cooling begins. The viscosity measuring device continuously measures the viscosity of the pitch as it cools down and the temperature measuring device continuously measures the temperature of the pitch. After the measurement the sample is returned to the reactor.

Figure 3:
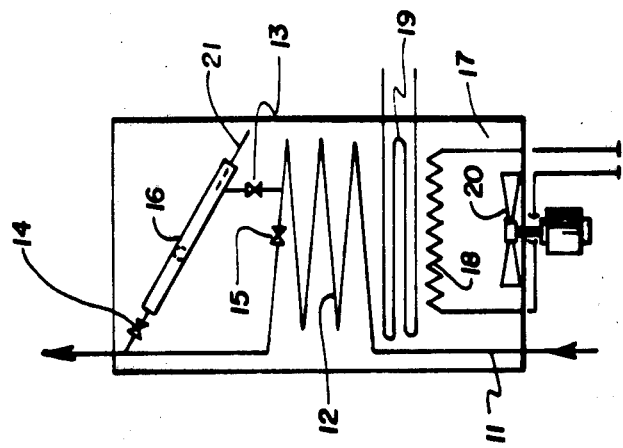
FIG. 3 illustrates a preferred apparatus embodiment.

FIG. 3 is an illustration of a preferred apparatus of my invention. A sample of the pitch material is taken from the reactor through a side line 11 comprising a coil 12 and automatically actuated valves 13, 14 and 15. The valves 13 and 14 are open when valve 15 is closed and they are closed when 15 is opened. The valves are actuated by electric impulses from the relay which is part of the viscosity measuring device 16. The viscosity device 16, automatic valves 13, 14 and 15 and sample coil 12 are enclosed in a chamber 17 provided with a heating element 18, cooling coil 19 and preferably a fan 20 to maintain reasonably constant temperature levels controlled by the indications of the temperature sensor 21.

Figure 4:
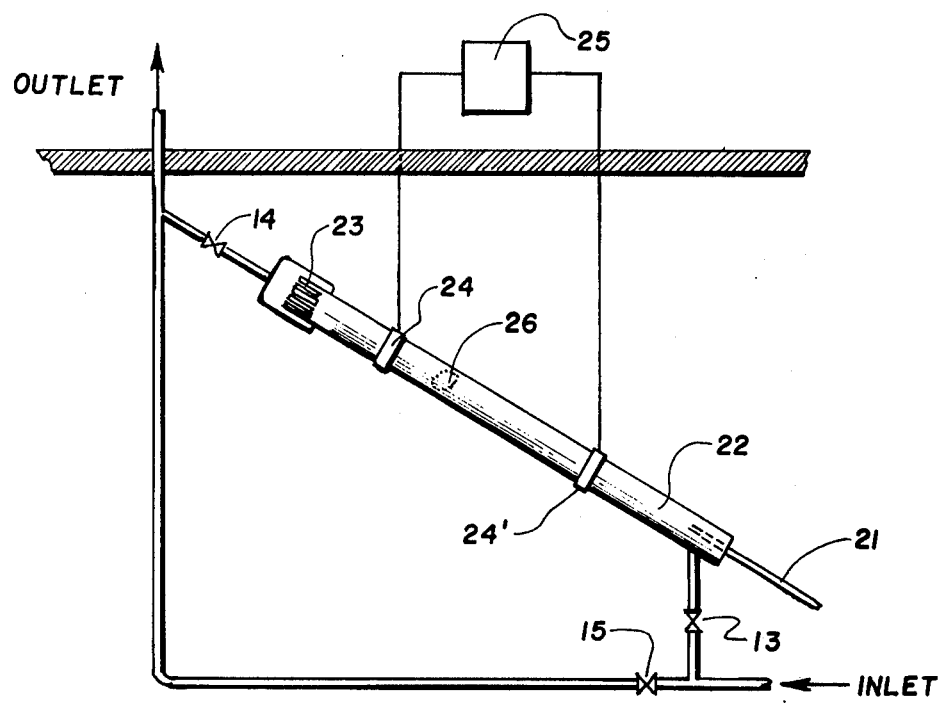
FIG. 4 is a detailed illustration of the viscosity measuring device.

The viscosity measuring device is illustrated in FIG. 4 in detail. It comprises a precision bore inclined glass tubing 22 provided with slots at the upper end 23 and two ring shape-clips 24 connected to the capacitance relais 25 and attached to the tubing at a definite distance from each other. It operates in the following manner: A steel ball 26 falls from the upper end of the precision bore glass tubing filled with the viscous sample to its lower end and attains a velocity determined by the viscosity of the viscous medium. It passes two ring clips and, due to the capacity changes at these moments, it generates electrical impulses by means of the capacitance relais R. The time interval between these impulses is directly proportional to the viscosity of the various medium at a temperature measured by the temperature sensor 21.

Figure 5:
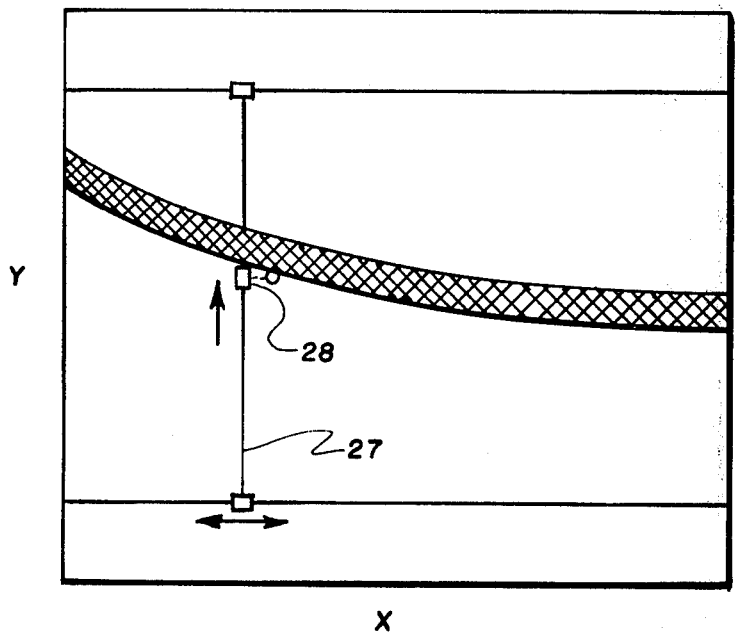
FIG. 5 illustrates means for the comparison of temperature viscosity value with the preset value.

This temperature viscosity value is compared with the present correlation in the following manner (FIG. 5). The electrical input from the temperature sensor 21 is transformed into the mechanical movement of the vertical bar 27 along with Axis X. Therefore, the position of this bar along the X axis is directly proportional to the value of the temperature in the viscous medium. Index 28 is moved vertically along the bar 27 with precisely linear velocity. Its movement can be accomplished, for instance, by a synchronous motor. This movement starts at the moment when the input from clip 24 is obtained and stops at the moment when the input from clip 24' is received. The position of the index 28 is thus the function of the viscosity at a given temperature. The index 28 can be provided, for instance, with a light sensitive element which generates the controlling signal to the production unit depending upon its maximum deflection with respect to the boundary between the light or dark area of the controlling unit.

A single measurement is finished when the sphere 26 passes the clip 24'. In that moment, the relais 25 actuates the automatic valves 13, 14 and 15 so that valves 13 and 14 open and 15 closes and gives an impulse to control the still and to return index 28 into the starting position. The stream of the viscous material passing through the tubing pushes the sphere 26 to its upper end and flows out from the slots 23. After a while another electrical input from the time delay relay connected with capacitance relay 25 closes valves 13 and 14 and opens valve 15. The measurement of viscosity starts again. The controlling line in the controller is drawn beforehand according to the predetermined viscosity-temperature correlation of the pitch.

Thus, very frequent control of the operating parameters according to the viscosity-temperature correlation minimizes losses of viscous material which is out of specification and guarantees uniformity of the produced viscous material. The apparatus of my invention has a means for heating and a means for cooling the sample pitch. The heating means may be of any conventional type. For example, it can be an electric coil, circulating water, circulating steam, or any other of the commonly employed heating devices. The heating means may easily be located outside of the sample chamber. It is within the scope of this invention to use a heating means located outside of the sample chamber. For example, the pitch sample may easily be heated in the conduit which brings the sample to the chamber. The cooling means is somewhat optional and the sample may be allowed to cool by natural convection. However, in order to speed up the process a cooling means should be employed. Examples of some applicable cooling means are forced air, circulating water, circulating refrigerant, or any other of the well known and employed cooling devices.

The apparatus of my invention also has a means for withdrawing a sample of pitch from the still and a means for returning it thereof. These means are generally a series of valves, pipes and pumps. They may also be combined into one means which withdraws the sample and returns it to the reactor. It is also within the scope of this invention to discard the sample after measuring the viscosity and temperature. The sample may easily be discarded especially when it is of a small magnitude.

The temperature sensing means of my invention may be of any conventional type. Examples of some useful temperature sensing devices are mercury bulb thermometers and thermocouples and resistance thermometers.

The viscosity sensing means of my invention may be any means which will accurately measure the viscosity of the pitch. Examples of some useful viscosity sensing means are a torsion rheometer, falling bail viscometer, and vibrating probe viscometer.

What is claimed is:

1. A method for controlling the operation of a pitch still comprising the steps of:
   a. simultaneously measuring the viscosity and temperature of a sample of the pitch at a changing but exactly known temperature;
   b. comparing the measured value with a predetermined correlation of viscosity and temperature;
   c. adjusting the parameters of the pitch still operation in response to the comparison.

* * * * *

UNITED STATES PATENT AND TRADEMARK OFFICE
CERTIFICATE OF CORRECTION

PATENT NO. : 4,048,056
DATED : September 13, 1977
INVENTOR(S) : George R. Romovacek It is certified that error appears in the above-identified patent and that said Letters Patent are hereby corrected as shown below:

Column 2, Line 10    after "temperature" insert --sensing--

Column 2, Line 29    "course" should be 'coarse'

Column 3, Line 41    "to" should be 'too'

Column 4, line 10, "various" should read -- viscous --.

Column 4, line 14, "present" should read -- preset --.

Column 4, line 51, after "sample" insert -- of --.

Column 5, line 3, "thereof" should read -- thereto --.

Column 6, line 4, "bail" should read -- ball --.

Signed and Sealed this

Seventh Day of March 1978

[SEAL]

Attest:

RUTH C. MASON
Attesting Officer

LUTRELLE F. PARKER
Acting Commissioner of Patents and Trademarks